US011929999B2

(12) United States Patent
Touitou et al.

(10) Patent No.: US 11,929,999 B2
(45) Date of Patent: Mar. 12, 2024

(54) DEVICE AND METHOD FOR ATTESTING DISTRIBUTED SERVICES

(71) Applicant: HUAWEI CLOUD COMPUTING TECHNOLOGIES CO., LTD., Gutan New District (CN)

(72) Inventors: Dan Touitou, Munich (DE); Avigail Oron, Hod Hasharon (IL)

(73) Assignee: HUAWEI CLOUD COMPUTING TECHNOLOGIES CO., LTD., Gui'an New District (CN)

( * ) Notice: Subject to any disclaimer, the term of this patent is extended or adjusted under 35 U.S.C. 154(b) by 462 days.

(21) Appl. No.: 17/200,423

(22) Filed: Mar. 12, 2021

(65) Prior Publication Data
US 2021/0203649 A1 Jul. 1, 2021

Related U.S. Application Data

(63) Continuation of application No. PCT/EP2018/074659, filed on Sep. 12, 2018.

(51) Int. Cl.
*H04L 9/40* (2022.01)
*G06F 21/44* (2013.01)
(Continued)

(52) U.S. Cl.
CPC .............. *H04L 63/08* (2013.01); *G06F 21/71* (2013.01); *G06F 2221/2149* (2013.01)

(58) Field of Classification Search
CPC ....... H04L 63/08; H04L 63/00; H04L 9/3234; H04L 9/3247; G06F 21/71; G06F 21/57; G06F 21/44; G06F 2221/2149
See application file for complete search history.

(56) References Cited

U.S. PATENT DOCUMENTS 11,238,449 B2 * 2/2022 Fedorov .............. H04L 63/0823
2015/0229619 A1 8/2015 Costa et al.
(Continued)

FOREIGN PATENT DOCUMENTS

| CN | 102195987 A | 9/2011 |
| CN | 103051643 A | 4/2013 |
| CN | 108462689 A | 8/2018 |

OTHER PUBLICATIONS

Asokan et al., "SEDA: Scalable Embedded Device Attestation," Proceedings of the 22nd ACM SIGSAC Conference on Computer and Communications Security CCS'15, XP055332704, total 12 pages (2015).
(Continued)

*Primary Examiner* — Vu V Tran
(74) *Attorney, Agent, or Firm* — Leydig, Voit & Mayer, Ltd.

(57) ABSTRACT

A node provides a service to a client node in a network. The node is configured to execute a code for providing the service to the client node in an enclave of a trusted execution environment (TEE) and to execute a code library in the enclave to attest to the client node the identity of the service provided. The service provided to the client node may be a distributed service including a result of a cooperation of a plurality of neighbor nodes, which are connected to the node either directly or through other intermediate nodes. The code library is configured to attest to the client node the identity of the distributed service.

13 Claims, 5 Drawing Sheets

(51) Int. Cl.
*G06F 21/57* (2013.01)
*G06F 21/71* (2013.01)
*H04L 9/32* (2006.01)

(56) References Cited

U.S. PATENT DOCUMENTS

| | | | |
|---|---|---|---|
| 2016/0092700 A1* | 3/2016 | Smith | G06F 21/64 |
| | | | 726/1 |
| 2018/0109561 A1 | 4/2018 | Kegel | |
| 2018/0139044 A1* | 5/2018 | Lange | G06F 21/10 |
| 2019/0180006 A1* | 6/2019 | Bojjireddy | G06F 9/455 |
| 2019/0295049 A1* | 9/2019 | Karame | G06Q 20/0658 |
| 2020/0074450 A1* | 3/2020 | Fletcher | G06Q 20/065 |

OTHER PUBLICATIONS

Carpent et al., "Lightweight Swarm Attestation: a Tale of Two LISA-s," Proceedings of The 2017 ACM on Asia Conference on Computer and Communications Security Asia CCS'17, XP55587372, total 15 pages (2017).

Ibrahim et al., "DARPA: Device Attestation Resilient to Physical Attacks," WiSec '16: Proceedings of the 9th ACM Conference on Security & Privacy in Wireless and Mobile Networks, XP058277028, total 12 pages (2016).

\* cited by examiner

DEVICE AND METHOD FOR ATTESTING DISTRIBUTED SERVICES

CROSS-REFERENCE TO RELATED APPLICATIONS

This application is a continuation of International Application No. PCT/EP2018/074659, filed on Sep. 12, 2018, the disclosure of which is hereby incorporated by reference in its entirety.

TECHNICAL FIELD

The present disclosure relates to the communications field, and to a device and a method for securely communicating with a system of services distributed in a network.

BACKGROUND

A Trusted Execution Environment, such as Intel's Software Guard Extensions, SGX, technology, is a secure area inside a main processor that ensures that an application running in it has the following properties:
1. Code immutability—logic of the protected application cannot be altered.
2. Data confidentiality—application data cannot be accessed.
3. Attestation—the protected application has the ability to prove to a third party it is communicating with its identity, i.e. that it is indeed a specific program running in the TEE.

SGX performs attestation by using a dedicated protocol through which the protected code, the enclave, generates a signed report. This report usually contains a hash of a public key, and can be verified by Intel's Enhanced Privacy ID (EPID) system. In order to communicate with a third party, the enclave may send the signed report and the public key to the third party, which will verify the report authenticity, checks that the hash of the public key is equivalent to the hash included in the report and then uses that public key to generate a shared secret based channel with the enclave.

Currently the attestation protocol is adequate for monolithic applications, but not for distributed or micro service based systems as is illustrated in the following network architectures.

Figure 1:
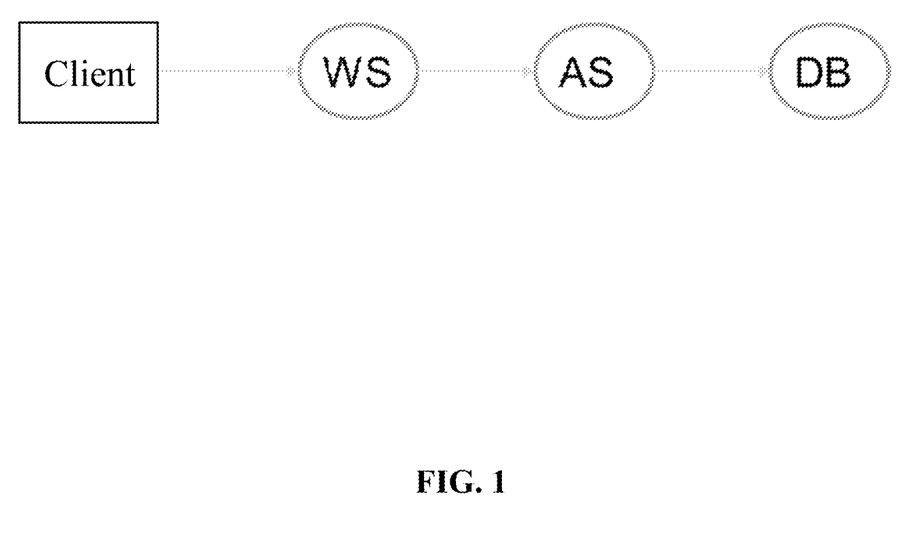
FIG. 1 shows a network architecture.

FIG. 1 depicts a web server (WS), which is the front end of a site accessible to a client, which also includes an application server (AS) and a data base server (DB). Clearly, the functionality provided by the application depends on all three components and not only on the web server itself. Consequently, any attestation process executed by the web server to build trust with a client must include all the components. In other words, the web server serving as a front end to be accessed by a client must convince the connecting client that it has the ability to distinguish between the above deployment and a deployment, where one of the components WS or DB has been replaced with a potentially untrusted one.

Figure 2:
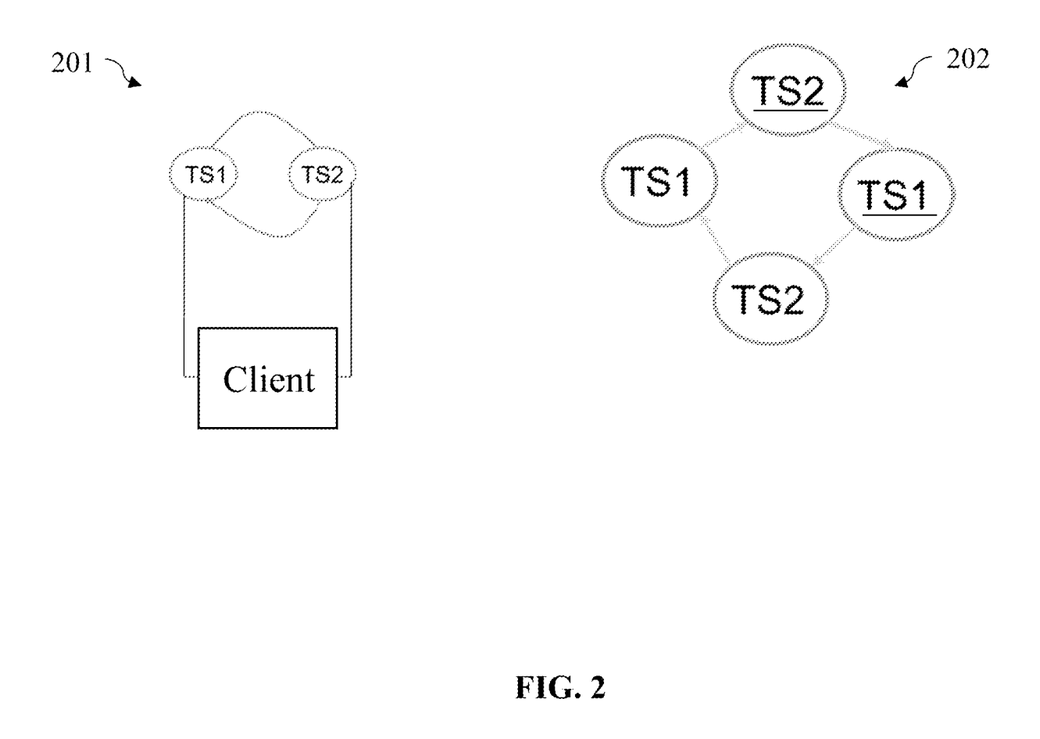
FIG. 2 shows another network architecture.

FIG. 2 depicts another deployment of distributed services, which poses a challenge for the present attestation protocol according to SGX technology. TS1 and TS2 in the network architecture 201 are two trusted services. At deployment, the application should be able to differentiate between the above topology and a potentially malicious deployment of the form 202, wherein a client unknowingly might connect with a false pair of TS1 and TS2, which mimic the service and interaction of the authentic service pair TS1 and TS2.

Figure 3:
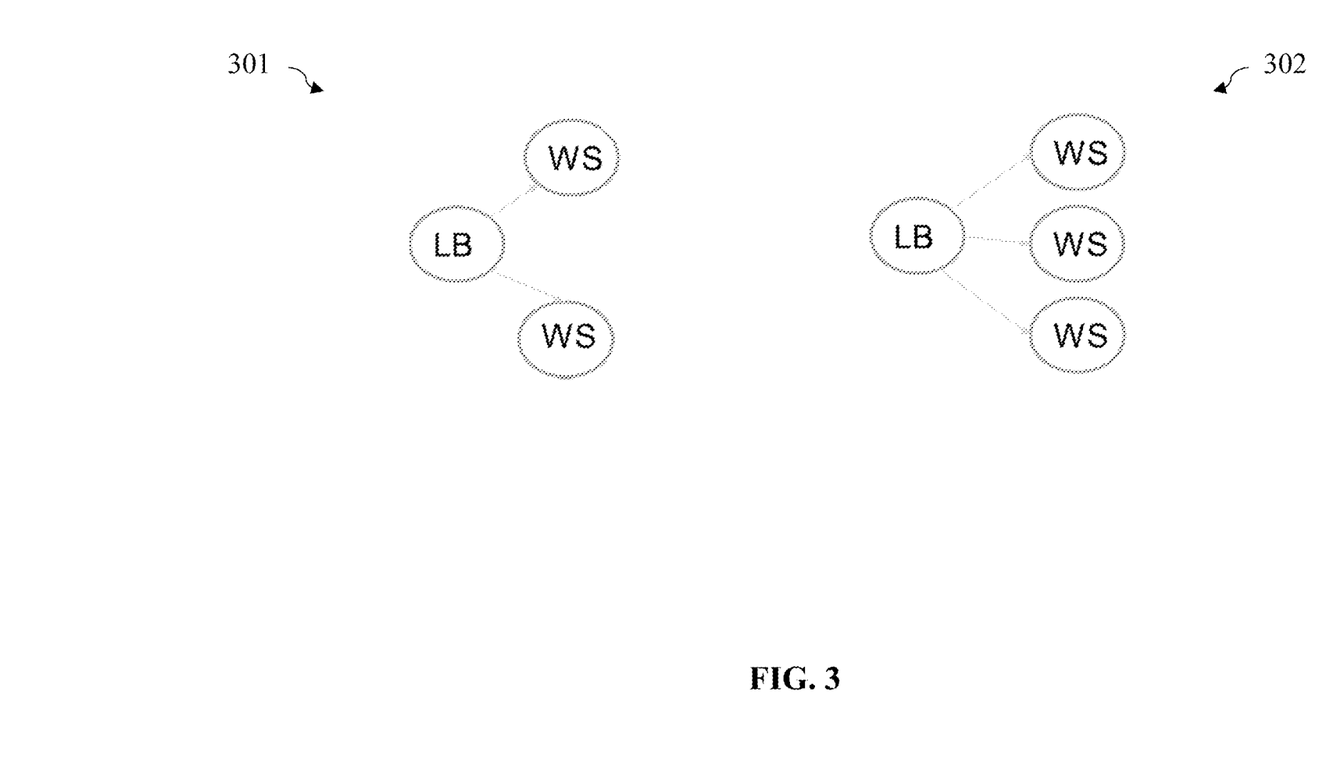
FIG. 3 shows yet another network architecture according.

FIG. 3 depicts yet another deployment of distributed services, which also poses a challenge for the present attestation protocol according to SGX technology. The two deployments 301 and 302 of distributed services are functionally equivalent, even when they have a different topology. This often happens during scale in and scale out of applications to respond to increased load, requiring additional modules. In the topology 301, a load balancer (LB) performing the role of a front end accessible by a client, distributes the load on two web servers (WS), while the topology 302 employs an additional web server running the same code to take account for increased load. Hence, the two deployments 301 and 302 might be two instances of the same application at two different times and should therefore be considered both legitimate instances of the same pattern.

Currently the only existing attestation mechanism is the above described mechanism provided by SGX, which however only works for monolithic applications. It does not provide a solution for distributed applications consisting of more than one enclave communicating with each other.

SUMMARY

In view of the above-mentioned problems and disadvantages, the present disclosure improves server solving issues of a conventional client, which is based on the transport layer security (TLS) protocol. In particular, embodiments of the present disclosure provide a server node, which executes a special code library enabling the server node to attest to a client node the identity of the service provided by the server node to the client node. In particular, the service provided to the client node is a distributed service of a mesh of cooperating nodes, wherein the code library is configured to attest to the client node the identity of the distributed service.

A first aspect of the present disclosure provides a node for providing a service to a client node in a network, the node being configured to execute a code for providing the service to the client node in an enclave of a trusted execution environment, TEE, and to execute a code library in the enclave to attest to the client node the identity of the service provided.

The code library to be executed in a node for providing a service to a client node in a network enables the node to prove to the client node that it is the node, which is meant to provide a specific service and not any other potentially malicious In-between-Node.

In a first implementation form of the first aspect, the service provided to the client node is a distributed service comprising a result of a cooperation of a plurality of neighbor nodes, which are connected to the node either directly or through other intermediate nodes and wherein the code library is configured to attest to the client node the identity of the distributed service.

While the TEE ensures integrity of data and code of the enclave running in the node, the additional code library ensures that each service or micro service, which contributes to the service provided to the client and which may run in an additional node or enclave respectively, is able to attest that it is a legitimate service provider.

In a further implementation form of the first aspect, the code library is configured to attest to the client node the identity of the distributed service by calculating when executed a trusted distributed identity, TDID, which is an injective function of the topology and code base of the distributed service.

The code library may contain a special distributed protocol, which is used to evaluate for every (micro) service contributing to the service provided to the client, its TDID. The TDID is a unique identifier for the distributed service based on its topology and code base. Any change in topology or code base, namely in the application deployment of the distributed service, may lead to a change in the TDID, which may trigger a stop of service to the client for reasons of security.

In a further implementation form of the first aspect, the code library is further configured to attest to the client node the identity of the distributed service by sending a report to the client node when executed, wherein the report comprises the TDID.

In order to communicate with a client node, the enclave of the node may send the report containing the TDID to the client node, which will verify the authenticity of the report by using the TDID.

In a further implementation form of the first aspect, the node is further configured to collect a trusted local ID, TLID, of each of the plurality of neighbor nodes, whereby the TLID is provided and attested by the TEE through a respective secured communication channel and combine the values of the TLIDs and to calculate the TDID of the distributed service based on the combined values of the TLIDs.

In a further implementation form of the first aspect, the TDID is calculated according to the recursive equation:

TDID=TDID($v$)=0 if neighbor node $v$ has no neighbors;TDID($n$)=hash(TLID1,TDID($n$1),TLID2, TDID($n$2), . . . ,TLIDN,TDID($RN$)); where TLIDx is the TLID of each of the plurality of neighbor nodes received on the respective secured communication channel.

By employing this recursive formula, a unique TDID of a particular application deployment providing a distributed service to a client may be calculated. According to the formula, each of the plurality of neighbor nodes belonging to the distributed service may be triggered to provide its unique TLID via a secured channel back to an antecedent node, which collects the TLIDs of its neighbors. This process may be repeated recursively until the triggering node constituting the front end node providing the service for the client is reached.

In a further implementation form of the first aspect, the TEE is based on instruction codes provided by software guard extensions, SGX, technology.

With SGX, the attestation is performed using a dedicated protocol through which the protected code, the enclave, generates a signed report. This report usually contains a hash of a public key and can be verified by an EPID system, which is an algorithm for attestation of a trusted system while preserving privacy. In order to communicate with a third party or a client, the enclave may send the signed report and the public key to the third party or client, which will verify the report authenticity, checks that the hash of the public key is equivalent to the hash included in the report and then uses that public key to generate a shared secret based channel with the enclave. For the purpose of the present disclosure, any technology, which ensures immutability and confidentiality of data and code of an enclave and which provides a secure channel between the service providing node and the client, may be used.

A second aspect of the present disclosure provides a system for providing a service to a client node in a network, comprising the node according to the first aspect or any implementation form thereof and a plurality of neighbor nodes connected with the node, wherein the node and the plurality of neighbor nodes form a distributed or micro service based system and are each configured to execute code in a trusted execution environment, TEE.

In a first implementation form of the second aspect, each of the plurality of neighbor nodes is configured to generate its respective TLID and respective local instance ID, LIID, whereby every instance of service code to be executed on an additionally installed neighbor node has a unique LIID.

In order to generate a unique TDID for a distributed service, each of the plurality of neighbor nodes, which contributes to the provided service may be enabled to calculate a trusted local ID, which is a function of the code base providing a unique number. Since an instance of a micro service is a copy of service code transferred to an additional node, its TLID would be identical. In order to keep track of an allowed number of such instances, a local instance ID, which is a unique number, may be attributed to each instance.

In a further implementation form of the second aspect, each of the plurality of neighbor nodes is configured to receive a probe request by the node to generate its respective TLID; if is running an instance of a same service code or has no further neighbors, notify the node and return the respective TLID; and if not, forward the probe request to further neighbors.

In this distribution scheme, a code library of the (front end) node may be enabled to send a probe request to its neighbor nodes, which are enabled to do the same, if they have also neighbor nodes. The probe (request) may permeate the network of nodes belonging to the same distributed service system and may collect the TLIDs of each qualitatively different (running different code) node. The accumulated TLIDs may be received at the originating (front end) node to be compounded to one TDID. TLIDs of nodes, which are running an instance of same code running on another neighbor node, necessarily produce a same TLID, which is not considered for calculating the TDID, but reported to the originating (front end) node together with the fact that the node is merely running an instance.

In a further implementation form of the second aspect, one of the plurality of neighbor nodes is configured to stop receiving requests, if it is running an instance of a same service code, but returns a TLID, which differs from the TLID of another instance of a same service code.

In order to prohibit malicious interference into the distributed service, a neighbor node pretending to run an instance of a same service code may be disabled, if it is detected that it is providing a deviant TLID.

In a further implementation form of the second aspect, the one of the plurality of neighbor nodes is further configured to recalculate its TLID, when it has been reestablished.

A third aspect of the present disclosure provides a method for providing a service to a client node in a network, comprising the steps of executing, by a node, a code for providing a service to a client node in an enclave of a trusted execution environment, TEE and executing, by the node, a code library in the enclave to attest the identity of the service provided to the client node.

A forth aspect of the present disclosure provides a computer program product comprising program code for controlling a device according to the first or second aspect or any implementation forms thereof or for performing, when implemented on a processor, a method according to the third aspect.

It has to be noted that all devices, elements, units and means described in the present disclosure could be implemented in the software or hardware elements or any kind of combination thereof. All steps which are performed by the various entities described in the present disclosure as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms of the present disclosure will be explained in the following description of specific embodiments in relation to the enclosed drawings, in which.

DETAILED DESCRIPTION

Figure 4:
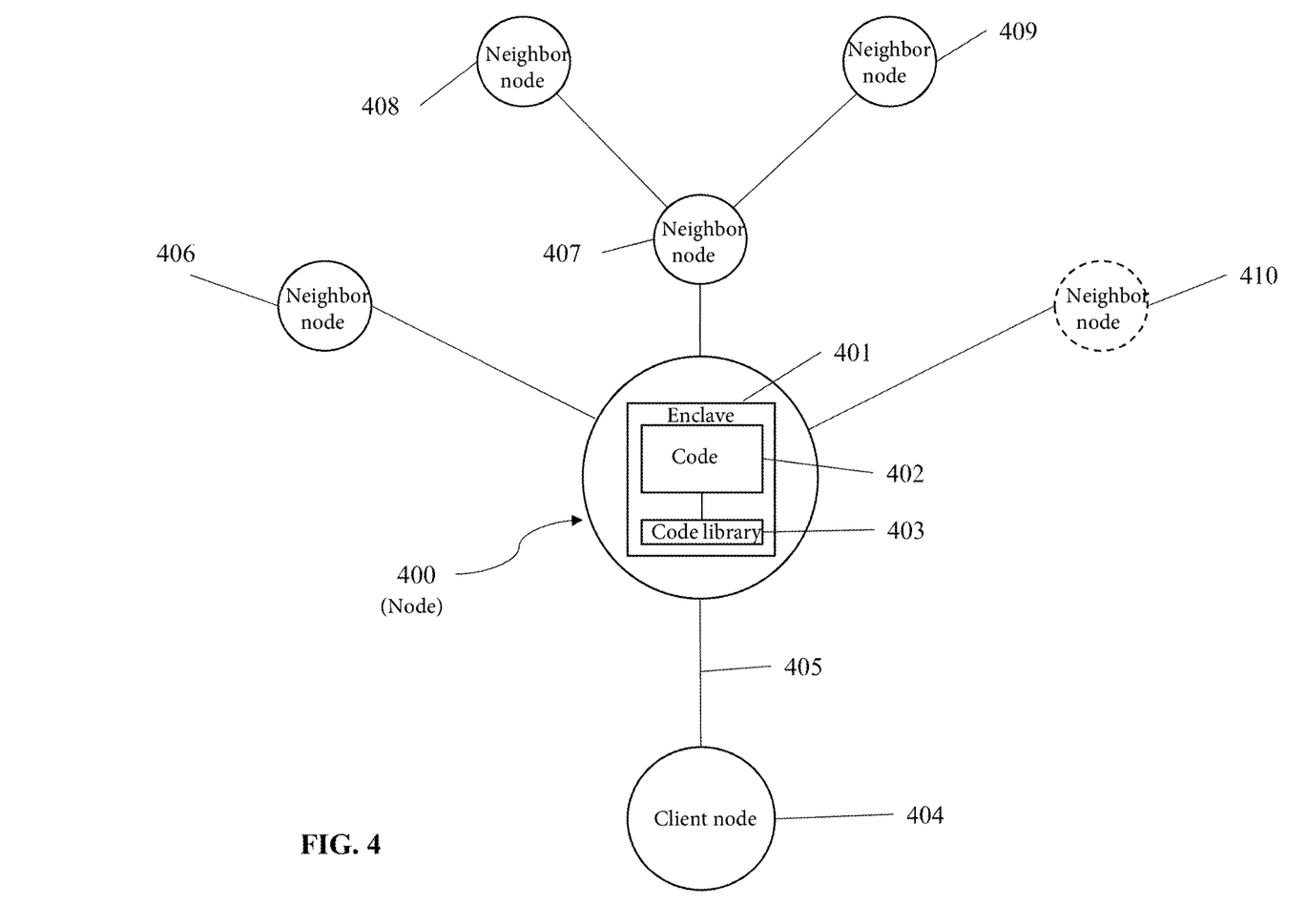
FIG. 4 shows a device according to an embodiment of the present disclosure.

FIG. 4 depicts a node 400 according to an embodiment of the present disclosure. The node may be configured to execute a code 402 for providing a service to a client node 404 in an enclave 401 of a TEE and to execute an additional code library 403 in the enclave 401 to attest to the client node the identity of the service provided.

The code library 403 may be further configured to prove to a third party or a client node 404 that a service application, which can be distributed among a plurality of neighboring and cooperating nodes 406 to 410 and provides a service to a client node 404, is indeed the specific distributed program authorized to provide the service to the client.

The code library 403 is further configured to attest to the client node 404 the identity of the distributed service by calculating when executed a trusted distributed identity (TDID), which is an injective function of the topology and code base of the distributed service. Since a malicious attempt to replace a node or code within a node of the service system results in a change of the topology and/or code base, an according injective function mapping the code base and/or topology to a unique number used as TDID would also yield a deviant number, which may trigger an alarm in the client node.

In a further embodiment of the present disclosure the node 400 may be configured to collect a trusted local ID (TLID) of each of the plurality of neighbor nodes 406 to 410, whereby the TLID is provided and attested by the TEE through respective secured communication channels, which connect the nodes 406 to 410 either directly or through other intermediate nodes to the node 400. The respective secured communication channels may enable each micro service or neighbor node 406 to 410 of the subnet of service nodes 400 and 406 to 410 providing a service to a client 404 to attest on its distributed identity by using a standard SGX attestation mechanism by inserting e.g. a hash of its respective TLID in the report to a higher level node initiating the identification procedure.

The node 400 constituting the highest level node in the service subnet of a network comprising a plurality of nodes 400 and 406 to 410, which provide a distributed service to a client node, may then be further configured to combine the values of the TLIDs and calculate a TDID of the distributed service based on the combined values of the TLIDs. The TDID of the distributed service may be considered as a fingerprint of the distributed service uniquely representing the topology and code base of the distributed service.

The calculation of the TDID may be carried out by the node 400 according to the following scheme of characteristic values of the constituents of the service subnet, which allows for the accumulation of TLIDs of each of the plurality of neighbor nodes in the service subnet providing a distributed service:

A local instance ID (LIID) of a neighboring node 410 may be defined by assigning a unique ID to every instance of a service code, whereby the instances are undiscernible with regards to their code. This may be achieved by generating a random number at first boot and sealing on the disk for further reboots. The local instance ID may be used for loop detection and does not affect the distributed ID of the enclave or other enclaves it might be connected to.

A trusted Local ID (TLID) can be a unique number representing the software's code base running on each of the plurality of nodes 406 to 410, whereby the TLIDs of instances of service code running on different nodes are the same. The node 410 may be an instance of code running on node 406 in order to, e.g. perform some sort of load balancing. The TLID may be provided and attested by the TEE.

DM LIB channels—every node of the service subnet maintains a secured channel with each and every trusted node, it gets service from. This channel may be created using the TEE attestation mechanism. Since the attestation mechanism enables the provision of the TLID of the attested neighbor node, every such channel may contain the TLID of the node connected to it. The DM lib channels are used to securely run the distributed identity calculation.

The code library in the node may further comprise a probe algorithm, which may be used to calculate the TDID according to the following distributed algorithm:

Send to all neighbors a probe (SET) subroutine, where SET is the set {LIID} over the secured channel and wait for the response. Let r1, rN be the responses received from the direct neighbor nodes 406, 407 and 410, the TDID may then be calculated in the following way:

(1) TDID=hash (TLID1, r1, TLID2, r2, TLIDN, RN), where TLIDx is the local enclave ID received on channel x during the attestation protocol In order to produce a response (as above), the neighboring nodes may execute the above probe request according to the following algorithm:

Whenever a node S in the subnet receives a probe request "probe(SET)", it performs the following:
If LIID(S) is in "SET" then return 0
If S has no neighbors return 0
Send request Probe(SET+{LIID(S)}) to all neighbors and wait for the responses
(2) Return hash (TLID1, r1, TLID2, r2, TLIDM, rM), where r1, rM are the neighbors responses Above developed scheme is now explained with the elements of FIG. 4. Once the probe reaches the outer perimeter of the subnet, namely nodes 408 and 409, these nodes both return the response "0", because each of them does not have a neighbor anymore. Moving to the next lower hierarchy, namely to nodes 406, 407 and 410, one will recognize that nodes 406 and 410 also respond with "0" to node 400, while node 407 responds with hash (TLID1, 0, TLID2, 0) to node 400 (according to above function (2)), whereby TLID1 is the TLID of node 408 and TLID2 is the TLID of node 409.

With this collected information node 400 may calculate the (final) TDID according to function (1) by calculating the according hash function, namely hash(TLID3, r3, TLID4, r4, TLID5, r5), whereby:

TLID3 is the TLID of node 406 and r3 is the response of node 406 (="0")

TLID4 is the TLID of node 407 and r4 is the response of node 407 (="hash(TLID1, 0, TLID2, 0)")

TLID5 is the TLID of node 410, running an instance of the code of node 406 and r5 is the response of node 410 (="0")

According to above scheme, the TLIDs of each node 406 to 410 of the subnet may be handed down to the node 400, which may calculate an authoritative TDID representative for the complete service topology and code serving a client node.

In a further implementation form of the node 400, its code library may further be configured to send the probe request to all instances of a same type of neighbor node application and then if all the responses, namely the TLIDs of the instances are the same, to take only one of them for the hash calculation yielding the TDID. By this measure, the previously assumed restriction of a fixed number of neighbor nodes during the entire distributed service application life is overcome and a scalable deployment is supported by this embodiment of the present disclosure. If one of the responses of the instances differs, the node 400 will get into a "faulty" state and will stop receiving requests from a client 404. Whenever a trusted channel is reestablished the node 400 has to recalculate the TDID. If the TDID changed, the node might decide to stop providing service and return an error. This embodiment of the present disclosure provides a solution to the problem discussed in FIG. 3.

Figure 5:
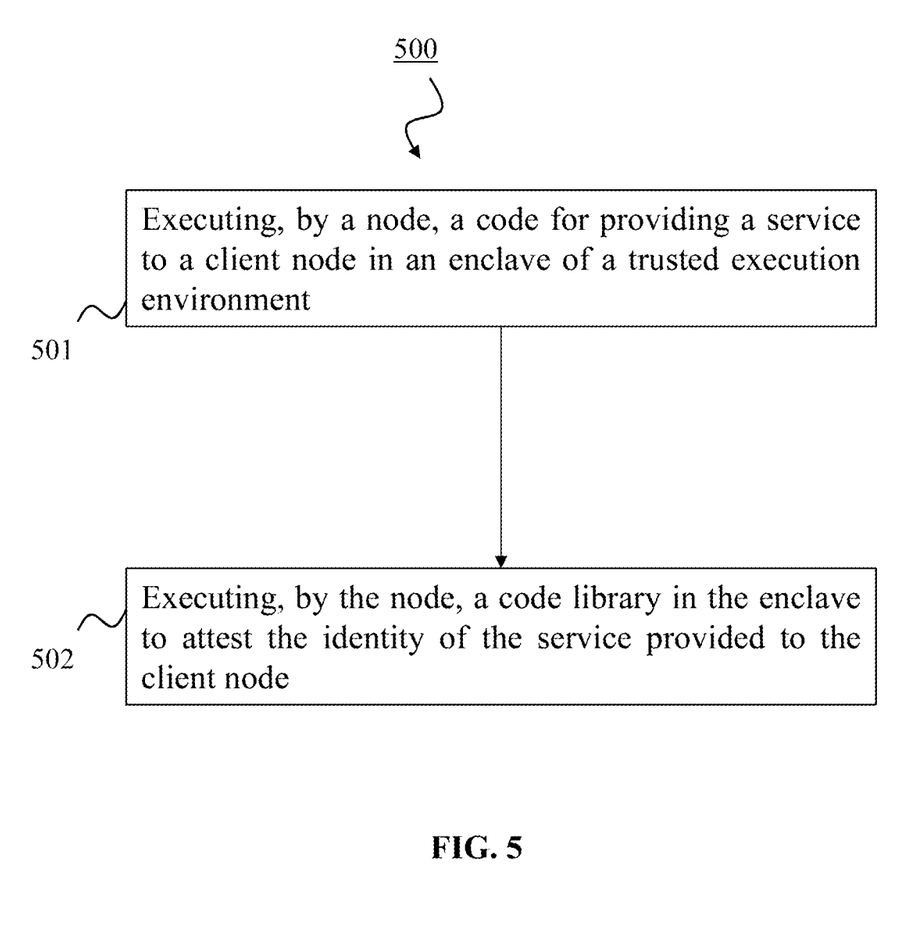
FIG. 5 shows a method according to an embodiment of the present disclosure.

FIG. 5 shows a method 500 according to an embodiment of the present disclosure, wherein the method comprises the steps of executing (501), by a node, a code for providing a service to a client node in an enclave of a trusted execution environment and executing (502), by the node, a code library in the enclave to attest the identity of the service provided to the client node. The method 500 may be carried out by a node 400 according to an embodiment of the disclosure.

The present disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A node for providing a service to a client node in a network, the node comprising a hardware processor, the hardware processor being configured to:
   execute a code configured to provide the service to the client node in an enclave of a trusted execution environment (TEE); and
   execute a code library in the enclave to attest to the client node an identity of the service provided,
   wherein the service provided to the client node is a distributed service comprising a result of a cooperation of a plurality of neighbor nodes, which are connected to the node either directly or through other intermediate nodes, and
   wherein the code library is configured to attest to the client node the identity of the distributed service by calculating, when executed, a trusted distributed identity (TDID), which is an injective function of a topology and a code base of the distributed service.

2. The node according to claim 1, wherein the code library is further configured to attest to the client node the identity of the distributed service by sending a report to the client node when executed, wherein the report comprises the TDID.

3. The node according to claim 1, wherein the node is further configured to:
   collect a trusted local ID (TLID) of each of the plurality of neighbor nodes, wherein the TLID is provided and attested by the TEE through a respective secured communication channel;
   combine values of the TLID of each of the plurality of neighbor nodes; and
   calculate the TDID of the distributed service based on the combined values of the TLID of each of the plurality of neighbor nodes.

4. The node according to claim 3, wherein the TDID is calculated according to the following recursive equation:

$$TDID=TDID(v)=0 \text{ if neighbor node } v \text{ has no neighbors;} TDID(n)=hash(TLID1,TDID(n1),TLID2, TDID(n2), \ldots ,TLIDN,TDID(RN));$$

where TLIDx is the TLID of each of the plurality of neighbor nodes received on the respective secured communication channel.

5. The node according to claim 1, wherein the TEE is based on instruction codes provided by software guard extensions (SGX) technology.

6. A system for providing a service to a client node in a network, the system comprising:
   a node comprising a hardware processor, the hardware processor being configured to:
   execute a code for providing the service to the client node in an enclave of a trusted execution environment (TEE), and
   execute a code library in the enclave to attest to the client node an identity of the service provided; and
   a plurality of neighbor nodes connected with the node,
   wherein the node and the plurality of neighbor nodes form a distributed or micro service based system and are each configured to execute code in the TEE,
   wherein each of the plurality of neighbor nodes is configured to generate a respective trusted distributed identity (TLID) and a respective local instance ID (LIID), wherein every instance of service code to be executed on an additionally installed neighbor node has a unique LIID, and wherein each of the plurality of neighbor nodes is configured to:
receive a probe request by the node to generate the respective TLID;
in a state where the respective one of the neighbor nodes is running an instance of a same service code or has no further neighbors, notify the node and return the respective TLID; and
in other states, forward the probe request to further ones of the neighbor nodes.

7. The system according to claim 6, wherein one of the plurality of neighbor nodes is configured to stop receiving requests in the state where the respective one of the neighbor nodes is running the instance of the same service code, and in the other states returns a TLID, which differs from the TLID of another instance of the same service code.

8. The system according to claim 7, wherein the one of the plurality of neighbor nodes is further configured to recalculate the associated TLID, when a trusted channel has been reestablished.

9. A method for providing a service to a client node in a network, comprising:
executing, by a node, a code configured to provide the service to the client node in an enclave of a trusted execution environment (TEE); and
executing, by the node, a code library in the enclave to attest an identity of the service provided to the client node,
wherein the service provided to the client node is a distributed service comprising a result of a cooperation of a plurality of neighbor nodes, which are connected to the node either directly or through other intermediate nodes, and
wherein the code library is configured to attest to the client node the identity of the distributed service by calculating, when executed, a trusted distributed identity (TDID), which is an infective function of a topology and a code base of the distributed service.

10. The method according to claim 9, wherein the code library is further configured to attest to the client node the identity of the distributed service by sending a report to the client node when executed, wherein the report comprises the TDID.

11. The method according to claim 9, wherein the method further comprises:
collecting a trusted local ID (TLID) of each of the plurality of neighbor nodes, whereby the TLID is provided and attested by the TEE through a respective secured communication channel and combine the values of the TLIDs; and
calculating the TDID of the distributed service based on the combined values of the TLIDs.

12. The method according to claim 11, wherein the TDID is calculated according to the recursive equation:

$$TDID=TDID(v)=0 \text{ if neighbor node } v \text{ has no neighbors}; TDID(n)=\text{hash}(TLID1,TDID(n1),TLID2,TDID(n2),\ldots,TLIDN,TDID(RN));$$

wherein TLIDx is the TLID of each of the plurality of neighbor nodes received on the respective secured communication channel.

13. The method according to claim 9, wherein the TEE is based on instruction codes provided by software guard extensions (SGX) technology.

* * * * *

UNITED STATES PATENT AND TRADEMARK OFFICE
CERTIFICATE OF CORRECTION

PATENT NO. : 11,929,999 B2
APPLICATION NO. : 17/200423
DATED : March 12, 2024
INVENTOR(S) : Touitou et al.

Page 1 of 1

It is certified that error appears in the above-identified patent and that said Letters Patent is hereby corrected as shown below:

On the Title Page

(71) Applicant, Left-Hand Column, Line 2: "Gutan" should read -- Gui'an --.

In the Claims

Claim 4: Column 8, Lines 40-42: "TDID=TDID(v)=0 if neighbor node v has no neighbors;TDID(n)=hash (TLID1,TDID(n1),TLID2,TDID(n2),...,TLIDN,TDID(RN));" should read
-- TDID =
TDID(v) = 0, if v has no neighbors;
TDID(n) = hash (TLID1, TDID(n1) , TLID2, TDID(n2)...TLIDN, TDID(RN)); --.

Claim 9: Column 10, Line 4: "tity (TDID), which is an infective function of a topol-" should read
-- tity (TDID), which is an injective function of a topol- --.

Claim 12: Column 10, Lines 23-25: "TDID=TDID(v)=0 if neighbor node v has no neighbors;TDID(n)=hash (TLID1,TDID(n1),TLID2,TDID(n2),...,TLIDN,TDID(RN));" should read
-- TDID =
TDID(v) = 0 if v has no neighbors;
TDID(n) = hash (TLID1, TDID(n1) , TLID2, TDID(n2)...TLIDN, TDID(RN)); --.

Signed and Sealed this
Twenty-fifth Day of June, 2024

Katherine Kelly Vidal
*Director of the United States Patent and Trademark Office*